(12) United States Patent
Nguyen et al.

(10) Patent No.: US 8,267,599 B2
(45) Date of Patent: Sep. 18, 2012

(54) OPTICAL SUBASSEMBLY GROUNDING IN AN OPTOELECTRONIC MODULE

(75) Inventors: Hung V. Nguyen, San Jose, CA (US);
Yongshan Zhang, San Jose, CA (US);
Joshua Moore, Collingwood (CA)

(73) Assignee: Finisar Corporation, Sunnyvale, CA (US)

( * ) Notice: Subject to any disclaimer, the term of this patent is extended or adjusted under 35 U.S.C. 154(b) by 415 days.

(21) Appl. No.: 12/575,186

(22) Filed: Oct. 7, 2009

(65) Prior Publication Data

US 2011/0081120 A1    Apr. 7, 2011

(51) Int. Cl.
*G02B 6/36* (2006.01)

(52) U.S. Cl. ............... 385/92; 385/85; 385/88; 385/93; 385/94

(58) Field of Classification Search .................... 385/85, 385/88, 92, 93, 94
See application file for complete search history.

(56) References Cited

U.S. PATENT DOCUMENTS

| 2003/0236019 A1* | 12/2003 | Hanley et al. | 439/372 |
| 2006/0260838 A1* | 11/2006 | Ariel | 174/350 |
| 2009/0211801 A1* | 8/2009 | Edwards et al. | 174/377 |

* cited by examiner

*Primary Examiner* — Jack Berman
*Assistant Examiner* — Meenakshi Sahu
(74) *Attorney, Agent, or Firm* — Maschoff Gilmore & Israelsen (57) ABSTRACT

Optical subassembly grounding in an optoelectronic module. In one example embodiment, a conductive OSA grounding gasket assembly includes a top gasket and a bottom gasket. The top gasket includes a top shell surface and a top OSA surface. The top shell surface is configured to be in direct physical contact with a conductive top shell of an optoelectronic module. The top OSA surface is configured to make direct physical contact with a conductive housing of an OSA. The bottom gasket includes a bottom OSA surface and a bottom shell surface. The bottom OSA surface is configured to be in direct physical contact with the conductive housing of the OSA. The bottom shell surface is configured to make direct physical contact with a conductive bottom shell of the optoelectronic module.

20 Claims, 7 Drawing Sheets

OPTICAL SUBASSEMBLY GROUNDING IN AN OPTOELECTRONIC MODULE

BACKGROUND

Optoelectronic modules, such as optoelectronic transceiver or transponder modules, are increasingly used in electronic and optoelectronic communication. Optoelectronic modules typically communicate with a printed circuit board of a host device by transmitting electrical signals to the printed circuit board and receiving electrical signals from the printed circuit board. These electrical signals can then be transmitted by the optoelectronic module outside the host device as optical and/or electrical signals.

One common difficulty associated with the operation of optoelectronic modules is the generation of electromagnetic radiation. The generation of electromagnetic radiation by an optoelectronic module is a matter of significant concern because such electromagnetic radiation can cause electromagnetic interference (EMI) with other systems and devices in the vicinity, which can seriously impair, if not prevent, the proper operation of those other systems and devices. Thus, the control of EMI effects is an important consideration in the design and use of optoelectronic modules.

Another common difficulty associated with some optoelectronic modules concerns the assembly of the modules. For example, an optoelectronic module generally includes various components that must be secured within the module. Due to limitations in size and space, it can be difficult to secure components accurately and reliably within an optoelectronic module.

SUMMARY OF SOME EXAMPLE EMBODIMENTS

In general, example embodiments disclosed herein relate to optical subassembly (OSA) grounding to an optoelectronic module housing volumetric electrical grounding. The use of volumetric electrical grounding results in decreased electromagnetic radiation through the OSA as compared to a single point or relatively few points of electrical grounding.

In one example embodiment, a conductive OSA grounding gasket assembly includes a top gasket and a bottom gasket. The top gasket includes a top shell surface and a top OSA surface. The top shell surface is configured to be in direct physical contact with a conductive top shell of an optoelectronic module. The top OSA surface is configured to make direct physical contact with a conductive housing of an OSA. The bottom gasket includes a bottom OSA surface and a bottom shell surface. The bottom OSA surface is configured to be in direct physical contact with the conductive housing of the OSA. The bottom shell surface is configured to make direct physical contact with a conductive bottom shell of the optoelectronic module.

In another example embodiment, a conductive OSA grounding gasket includes a top shell surface, an OSA surface, and a bottom shell surface. The top shell surface is configured to be in direct physical contact with a conductive top shell of an optoelectronic module housing. The OSA surface is configured to make direct physical contact with and substantially surround a conductive housing of an OSA. The bottom shell surface is configured to make direct physical contact with a conductive bottom shell of the optoelectronic module housing.

In yet another example embodiment, an optoelectronic transceiver module includes a conductive shell. The conductive shell includes a conductive top shell and a conductive bottom shell attached to the conductive top shell. The optoelectronic transceiver module also includes a printed circuit board at least partially positioned within the conductive shell, a transceiver optical subassembly (TOSA) at least partially positioned within the conductive shell, and a receiver optical subassembly (ROSA) at least partially positioned within the conductive shell. The TOSA includes a conductive barrel and a transmitter positioned within the conductive barrel. The ROSA includes a barrel and a receiver positioned within the barrel. The optoelectronic transceiver module also includes a conductive TOSA grounding gasket. The conductive TOSA grounding gasket includes a top shell surface and a TOSA surface. The top shell surface is in direct physical contact with the conductive top shell. The TOSA surface in direct physical contact with the conductive barrel of the TOSA.

These and other aspects of example embodiments will become more fully apparent from the following description and appended claims.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF SOME EXAMPLE EMBODIMENTS

Example embodiments disclosed herein relate to the grounding of an electrically conductive optical subassembly (OSA) housing volumetric electrical grounding. The use of volumetric electrical grounding results in decreased electromagnetic radiation through the OSA as compared to a single point or relatively few points of electrical grounding. In addition, example volumetric electrical grounding devices disclosed herein can help solve grounding problems associated with gaps created as a result of manufacturing tolerances and stacking tolerances of components of optoelectronic modules, such as a top and bottoms shells, transmitter optical subassemblies (TOSAs), and receiver optical subassemblies (ROSAs), for example. Moreover, the example volumetric electrical grounding devices disclosed herein can compensate for thermally-induced effects such as expansion/contraction of optoelectronic module components.

Reference will now be made to the drawings to describe various aspects of some example embodiments. It is to be understood that the drawings are diagrammatic and schematic representations of such example embodiments, and are not limiting, nor are they necessarily drawn to scale.

1. First Example Optoelectronic Transceiver Module

Reference is first made to FIGS. 1A-1D which disclose aspects of a first example optoelectronic transceiver module 100 for use in transmitting and receiving optical signals in connection with a host device (not shown). As disclosed in FIGS. 1A and 1B, the optoelectronic transceiver module 100 includes various components, including a conductive shell 102 that includes a conductive top shell 104 and a conductive bottom shell 106. An output port 108 and an input port 110 are generally positioned forward of the conductive shell 102. The conductive top shell 104 and the conductive bottom shell 106 can be formed using a die casting process, machining operation, or any other suitable process(es). For example, the conductive top shell 104 and the conductive bottom shell 106 can be die cast from zinc and then plated with copper plating and nickel plating. However, it is understood that the conductive top shell 104 and the conductive bottom shell 106 may alternatively be die cast, plated, and/or otherwise constructed from other suitable conductive material(s), such as aluminum for example.

Figure 1A:
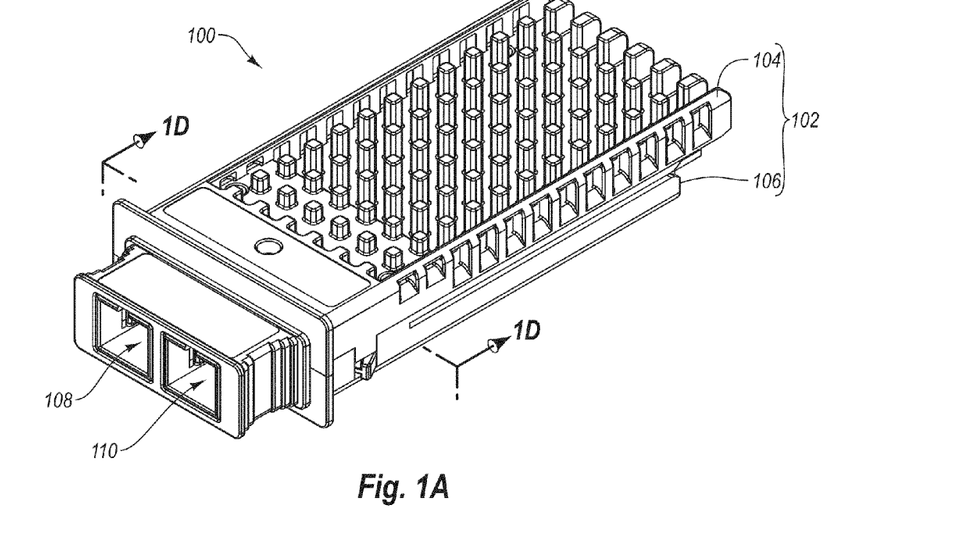
FIG. 1A is a top perspective view of an example optoelectronic transceiver module.
Figure 1B:
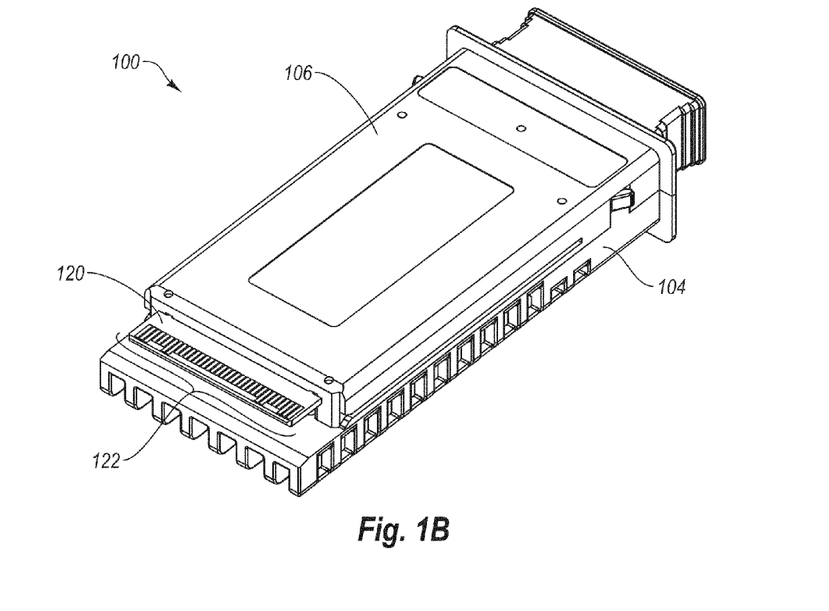
FIG. 1B is a bottom perspective view of the example optoelectronic transceiver module of FIG. 1A.
Figure 1C:
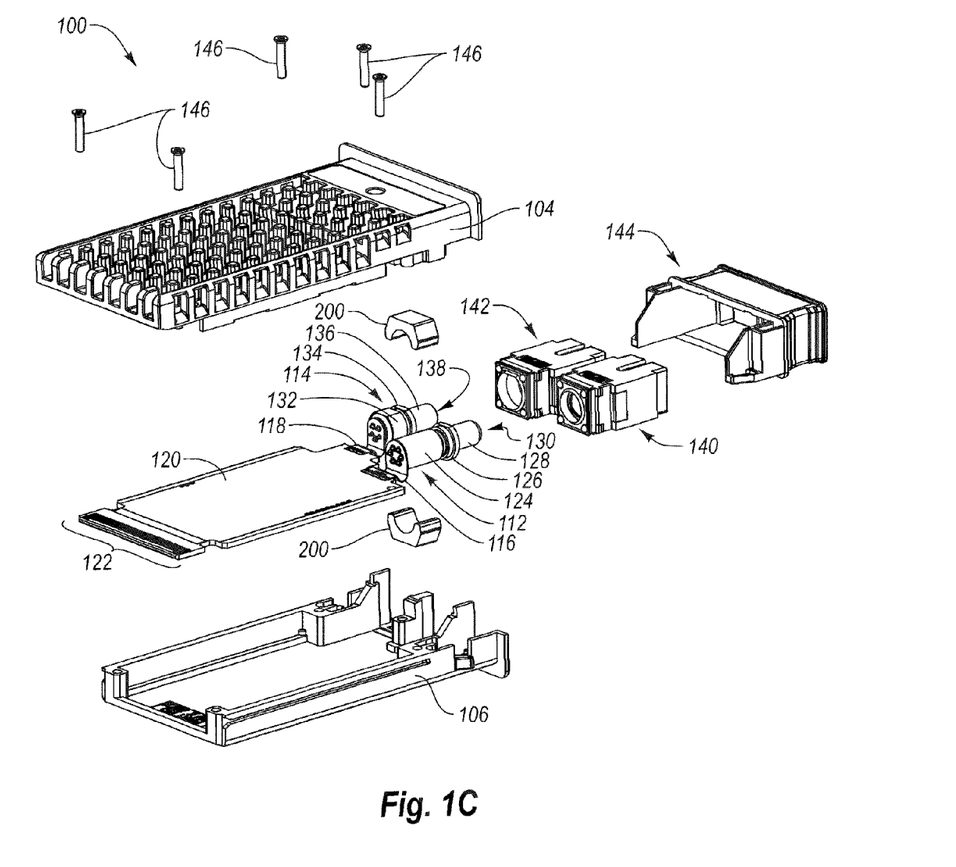
FIG. 1C is an exploded perspective view of the example optoelectronic transceiver module of FIG. 1A.

As disclosed in FIG. 1C, the example optoelectronic transceiver module 100 also includes a transmitter optical subassembly (TOSA) 112, a receiver optical subassembly (ROSA) 114, electrical interfaces 116 and 118, and a printed circuit board (PCB) 120 having an edge connector 122. The two electrical interfaces 116 and 118 are used to electrically connect the TOSA 112 and the ROSA 114, respectively, to the PCB 120.

The TOSA 112 of the optoelectronic transceiver module 100 includes a barrel 124 within which an optical transmitter, such as a laser, (not shown) is disposed. The optical transmitter is configured to convert electrical signals received through the PCB 120 from a host device (not shown) into corresponding optical signals. The TOSA 112 also includes a flange 126 and a nose piece 128. The nose piece 128 defines a port 130. The port 130 is configured to optically connect the optical transmitter disposed within the barrel 124 with a fiber-ferrule (not shown) disposed within the output port 108.

Similarly, the ROSA 114 of the optoelectronic transceiver module 100 includes a barrel 132, a flange 134, and a nose piece 136. The nose piece 136 defines a port 138. The port 138 is configured to optically connect an optical receiver, such as a photodiode (not shown), disposed within the barrel 132 to a fiber-ferrule (not shown) disposed within the input port 110. The optical receiver is configured to convert optical signals received from the fiber-ferrule into corresponding electrical signals for transmission to a host device (not shown) through the PCB 120.

The optoelectronic transceiver module 100 can be configured for optical signal transmission and reception at a variety of per-second data rates including, but not limited to, 1.25 Gbit, 2.125 Gbit, 2.5 Gbit, 2.67 Gbit, 4.25 Gbit, 8.5 Gbit, 10.3 Gbit, 10.5 Gbit, 11.1 Gbit, 11.3 Gbit, 39.8 Gbit, 44.6 Gbit, or higher. Furthermore, the optoelectronic transceiver module 100 can be configured for optical signal transmission and reception at various wavelengths including, but not limited to, DWDM C and L Bands such as 850 nm, 1310 nm, 1470 nm, 1490 nm, 1510 nm, 1530 nm, 1550 nm, 1570 nm, 1590 nm, or 1610 nm. Further, the optoelectronic transceiver module 100 can be configured to support various communication standards including, but not limited to, Fast Ethernet, Gigabit Ethernet, 10 Gigabit Ethernet, 1x, 2x, 4x, 8x, and 10x Fibre Channel, and SONET OC-3, OC-12, OC-48, OC-192, and OC-768. In addition, although the optoelectronic transceiver module 100 is configured to have a form factor that is substantially compliant with the X2 MSA, the optoelectronic transceiver module 100 can alternatively be configured to have a variety of different form factors that are substantially compliant with other MSAs or standards including, but not limited to, SFP, SFP+, SFF, GBIC, PON, XFP, XPAK, XENPAK, BUTTERFLY, and 300-PIN.

With continued reference to FIG. 1C, the optoelectronic transceiver module 100 also includes a TOSA positioning block 140, a ROSA positioning block 142, a release handle 144, and fasteners 146. The TOSA positioning block 140 is configured to align the port 130 of the TOSA 112 with the output port 108. Similarly, the ROSA positioning block 142 is configured to align the port 138 of the ROSA 114 with the input port 110. The release handle 144 functions to release the optoelectronic transceiver module 100 from a host device when pulled on by a human technician. The fasteners 146 are configured to attach the conductive top shell 104 to the conductive bottom shell 106. The optoelectronic transceiver module 100 further includes an example top conductive OSA grounding gasket 200 and an example bottom conductive OSA grounding gasket 200 that is identical in size and shape to the top gasket. The top and bottom gaskets 200 together make up a gasket assembly.

With reference now to FIGS. 2A-2D, additional aspects of the top and bottom gaskets 200 are disclosed. As disclosed in FIGS. 2A-2D, each gasket 200 includes an OSA surface 202 configured to make direct physical contact with the conductive barrel 124 of the TOSA. Each gasket 200 further includes shell surfaces 204, 206, and 208 configured to be in direct physical contact with the conductive shell 102 (see FIG. 1A) of the optoelectronic module 100.

Figure 1D:
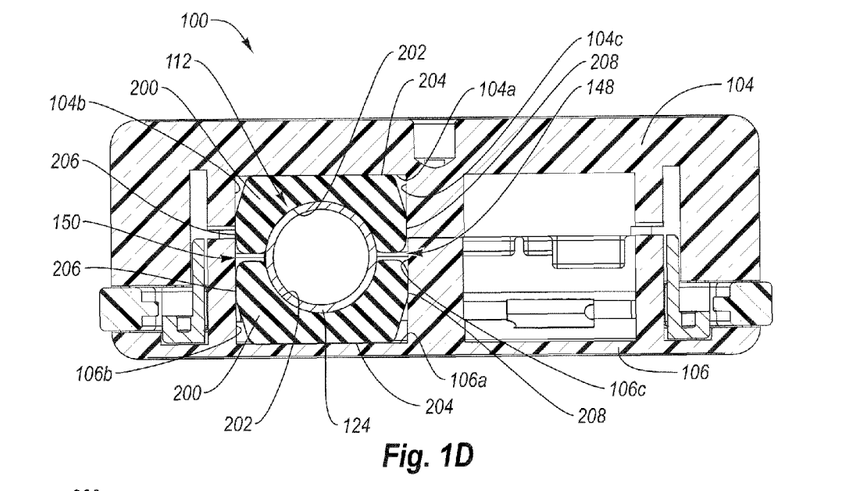
FIG. 1D is a cross-sectional view of the example optoelectronic transceiver module of FIG. 1A.
Figure 2A:
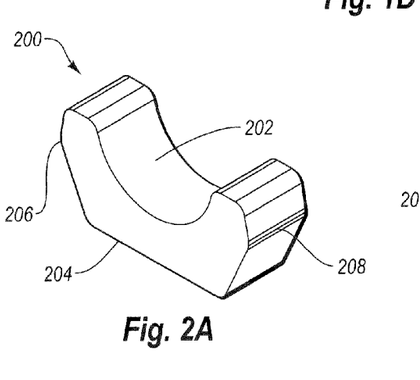
FIG. 2A is a top perspective view of an example conductive optical subassembly (OSA) grounding gasket.
Figure 2B:
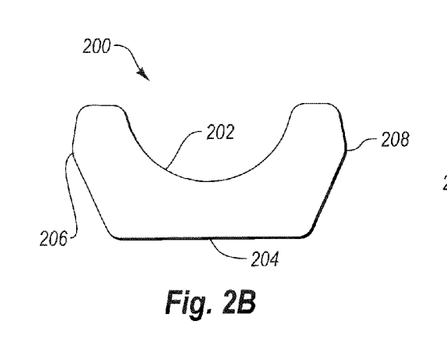
FIG. 2B is a front view of the example conductive OSA grounding gasket of FIG. 2A.
Figure 2C:
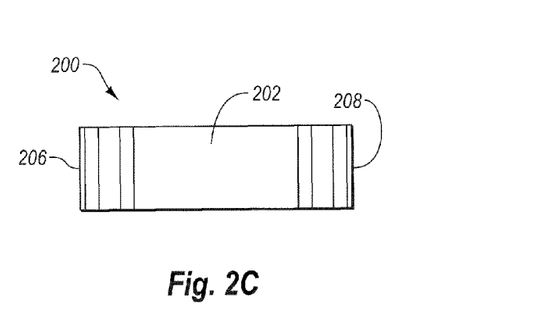
FIG. 2C is a top view of the example conductive OSA grounding gasket of FIG. 2A.
Figure 2D:
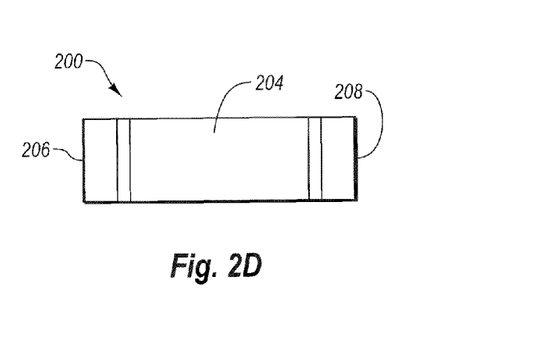
FIG. 2D is a bottom view of the example conductive OSA grounding gasket of FIG. 2A.

With reference now to FIG. 1D, the top gasket 200 and the bottom gasket 200 substantially surround a perimeter of the conductive barrel 124 of the TOSA 112, leaving only minor gaps 148 and 150 between the top and bottom gaskets 200. At the same time, the shell surfaces 204, 206, and 208 of the top gasket 200 are in direct physical contact with inside surface 104a, 104b, and 104c of the conductive top shell 104. Similarly, the shell surfaces 204, 206, and 208 of the bottom gasket 200 is in direct physical contact with inside surface 106a, 106b, and 106c of the conductive bottom shell 106.

Each of the top and bottom gaskets 200 is formed from a conductive material that allows the conductive barrel 124 of the TOSA 112 to be grounded to the conductive top and bottom shells 104 and 106. For example, the top and bottom gaskets 200 may be formed from a conductive elastomer. Some examples are silicone elastomer filled with nickel-plated graphite particles such as CHO-SEAL® 6370 or 6317. Alternatively the top and bottom gaskets 200 may be formed from a different type of elastomer or rubber with silver plated or other conductive plated particles or fibers.

The elastic properties of the materials from which the top and bottom gaskets 200 are formed enable the top and bottom gaskets 200 to compress slightly, and therefore compensate for manufacturing tolerances, as the top and bottom gaskets 200 are positioned and secured within the conductive shell 102 of the optoelectronic module 100. This slight compression of the top and bottom gaskets 200 within the conductive shell 102 enables reliable electrical contact with the conductive shell 102 and the conductive barrel 124 of the TOSA 112 across a relatively large and continuous surface area as compared to a single point or relatively few points of electrical contact between the conductive barrel 124 and the conductive shell 102. This relatively large and continuous surface area of electrical contact, as well as the configuration of the top and bottom gaskets 200 to substantially surround the perimeter of the conductive barrel 124 of the TOSA 112, enable volumetric electrical grounding of the TOSA 112. The term "volumetric electrical grounding" as defined herein refers to the grounding of an OSA over a relatively large and continuous surface instead of via a single point or relatively few points of electrical contact. Volumetric electrical grounding of the TOSA 112 results in decreased electromagnetic radiation through the port 130 as compared to electrical grounding of the TOSA 112 via a single point or relatively few points of electrical contact.

2. Second Example Optoelectronic Transceiver Module

Reference is now made to FIGS. 3A-3D which disclose aspects of a second example optoelectronic transceiver module 300. As disclosed in FIGS. 3A and 3B, the optoelectronic transceiver module 300 includes including a conductive shell 302 that includes a conductive top shell 304 and a conductive bottom shell 306. An output port 308 and an input port 310 are at least partially defined in the conductive bottom shell 306. The conductive top shell 304 and the conductive bottom shell 306 can be formed using similar process and from similar materials as the conductive top and bottom shells 104 and 106.

Figure 3A:
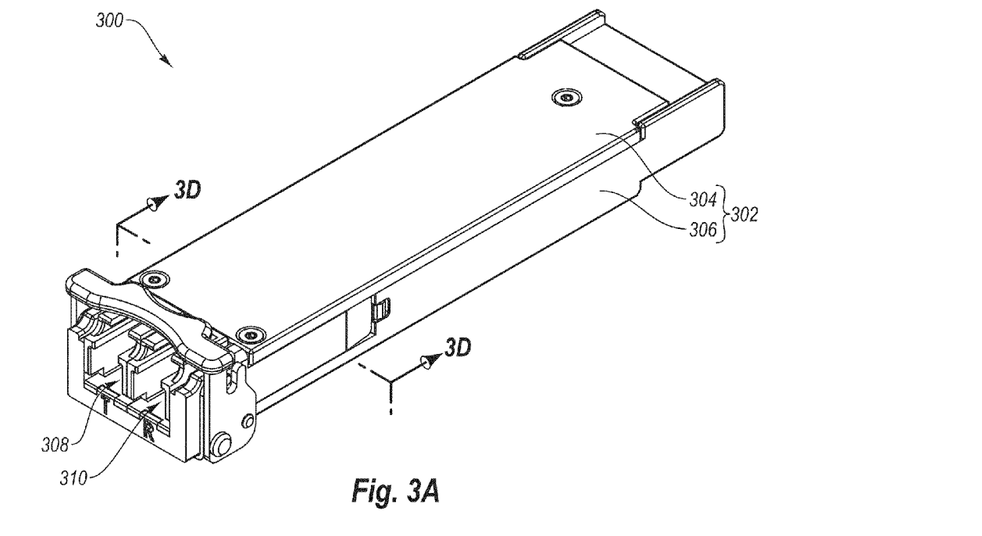
FIG. 3A is a top perspective view of another example optoelectronic transceiver module.
Figure 3B:
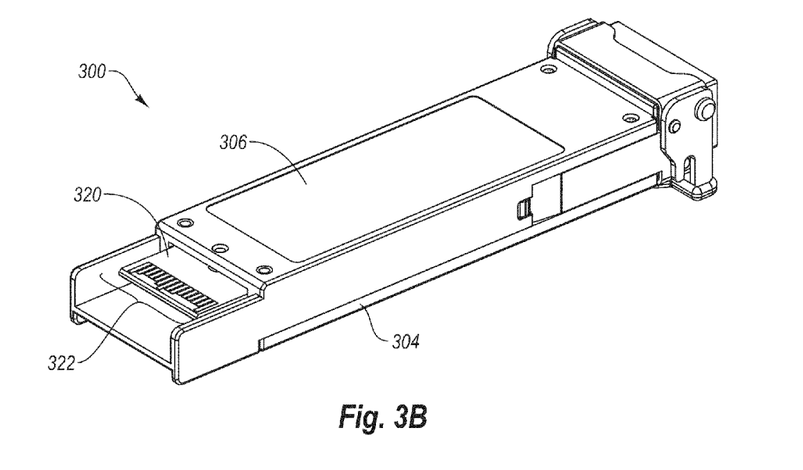
FIG. 3B is a bottom perspective view of the example optoelectronic transceiver module of FIG. 3A.
Figure 3C:
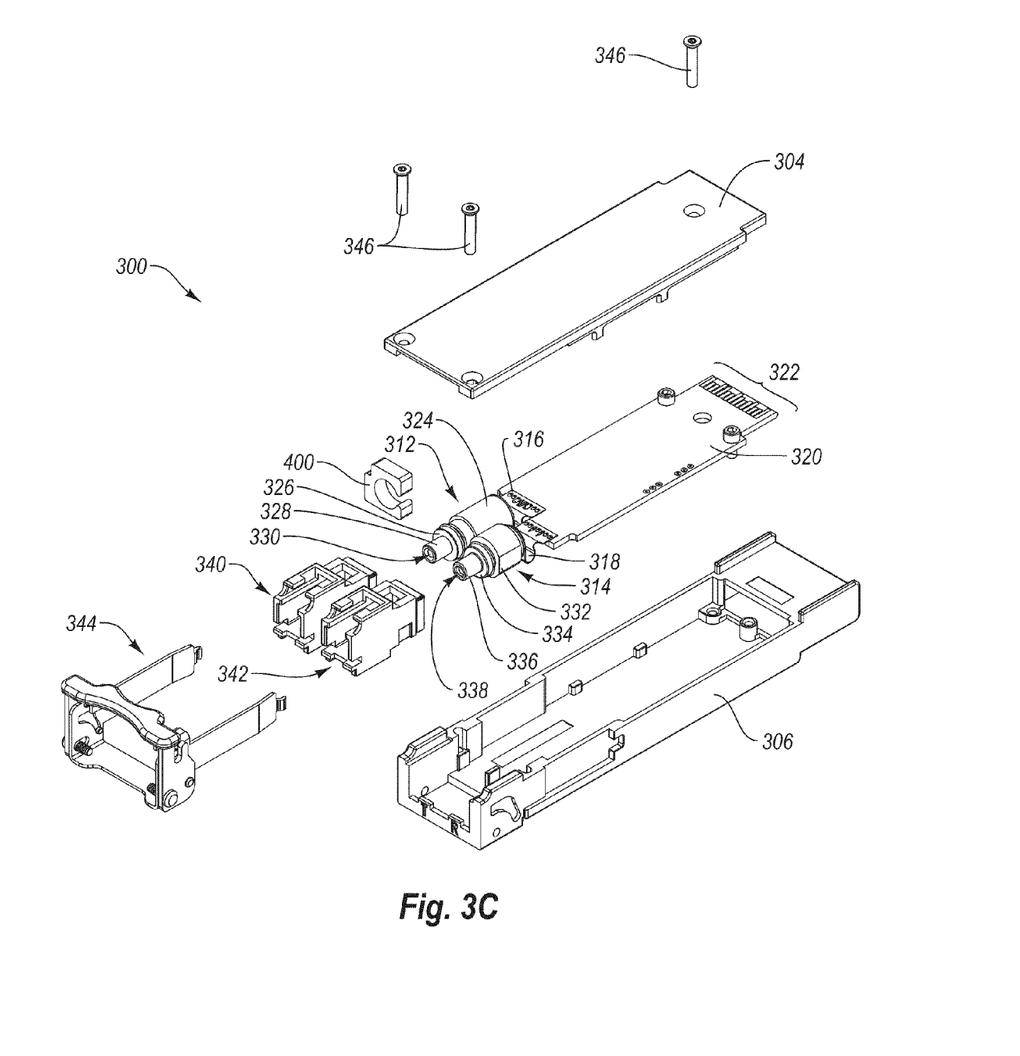
FIG. 3C is an exploded perspective view of the example optoelectronic transceiver module of FIG. 3A.

As disclosed in FIG. 3C, the example optoelectronic transceiver module 300 also includes a TOSA 312, a ROSA 314, electrical interfaces 316 and 318, and a PCB 320 having an edge connector 322. The two electrical interfaces 316 and 318 are used to electrically connect the TOSA 312 and the ROSA 314, respectively, to the PCB 320. The TOSA 312 is similar to the TOSA 112 and includes a barrel 324, a flange 326, and a nose piece 328 that defines a port 330. The ROSA 314 is similar to the ROSA 114 and includes a barrel 332, a flange 334, and a nose piece 336 that defines a port 338.

The optoelectronic transceiver module 300 can be configured for optical signal transmission and reception at data rates and wavelengths and use communication standards similar to those listed herein in connection with the module 100. In addition, although the optoelectronic transceiver module 300 is configured to have a form factor that is substantially compliant with the XFP MSA, the optoelectronic transceiver module 300 can alternatively be configured to have a variety of different form factors that are substantially compliant with other MSAs or standards including those listed herein in connection with the module 100.

With continued reference to FIG. 3C, the optoelectronic transceiver module 300 also includes a TOSA positioning block 340, a ROSA positioning block 342, a release mechanism 344, and fasteners 346. The optoelectronic transceiver module 300 further includes an example conductive OSA grounding gasket 400.

Figure 4A:
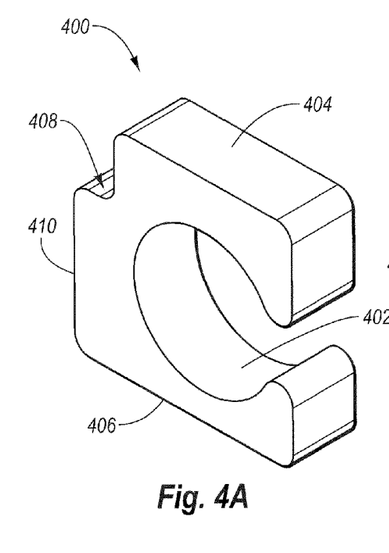
FIG. 4A is a top perspective view of another example conductive OSA grounding gasket.
Figure 4B:
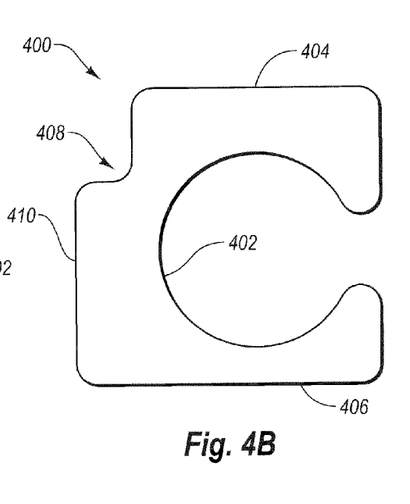
FIG. 4B is a front view of the example conductive OSA grounding gasket of FIG. 4A.

With reference now to FIGS. 4A-4B, additional aspects of the gasket 400 are disclosed. As disclosed in FIGS. 4A-4B, the gasket 400 includes an OSA surface 402 configured to make direct physical contact with the conductive barrel 324 of the TOSA. The gasket 400 further includes a top shell surface 404 configured to be in direct physical contact with the conductive top shell 304 of the optoelectronic module 300. The gasket 400 also includes a bottom shell surfaces 406 and 410 configured to be in direct physical contact with the conductive bottom shell 306 of the optoelectronic module 300. Finally, the gasket 400 also includes a rail indentation 408 configured to accommodate a rail formed in the conductive top shell 304 of the optoelectronic module 300.

Figure 3D:
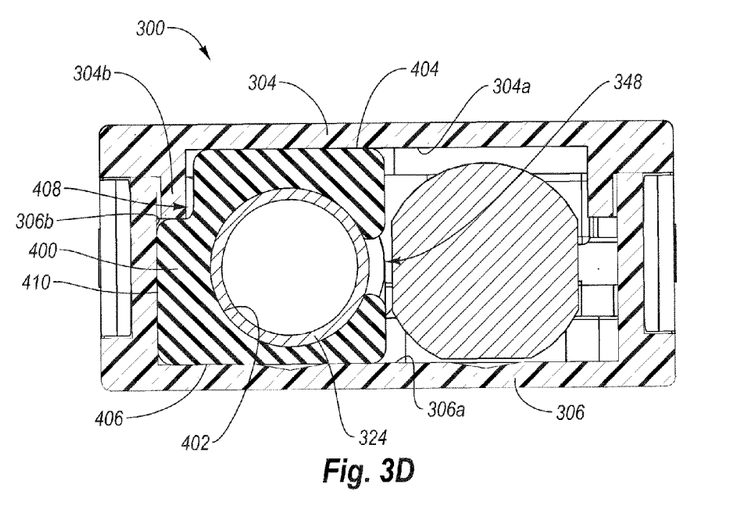
FIG. 3D is a cross-sectional view of the example optoelectronic transceiver module of FIG. 3A.

With reference now to FIG. 3D, the gasket 400 substantially surrounds a perimeter of the conductive barrel 324 of the TOSA 312, leaving only a minor gap 348. At the same time, the top shell surface 404 of the gasket 400 is in direct physical contact with an inside surface 304a of the conductive top shell 304. Similarly, the bottom shell surface 404 of the bottom gasket 400 is in direct physical contact with an inside surface 306a of the conductive bottom shell 306. Further, the bottom shell surface 410 of the gasket 400 is in direct physical contact with an inside surface 306b of the conductive bottom shell 306. Finally, as disclosed in FIG. 3D, the rail indentation 408 accommodates a rail 304b formed in the conductive top shell 304.

The gasket 400 is formed from a conductive material that allows the conductive barrel 324 of the TOSA 312 to be grounded to the conductive top and bottom shells 304 and 306. For example, the gasket 400 may be formed from any of the relatively elastic materials disclosed herein in connection with the gaskets 200.

The elastic properties of the materials from which the gasket 400 is formed enable the gasket 400 to compress slightly, and therefore compensate for manufacturing tolerances, as the gaskets 400 is positioned and secured within the conductive shell 302 of the optoelectronic module 300. This slight compression of the gasket 400 within the conductive shell 302 enables reliable electrical contact with the conductive shell 302 and the conductive barrel 324 of the TOSA 312 across a relatively large and continuous surface area as compared to a single point or relatively few points of electrical contact between the conductive barrel 324 and the conductive shell 302. This relatively large and continuous surface area of electrical contact, as well as the configuration of the gasket 400 to substantially surround the perimeter of the conductive barrel 324 of the TOSA 312, enable volumetric electrical grounding of the TOSA 312. As noted elsewhere herein, volumetric electrical grounding of the TOSA 312 results in decreased electromagnetic radiation through the port 330 as compared to electrical grounding of the TOSA 312 via a single point or relatively few points of electrical contact.

Figure 5A:
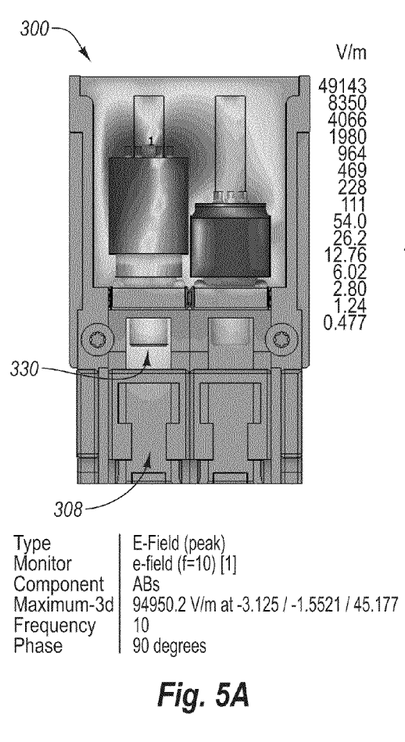
FIG. 5A discloses simulated electromagnetic radiation performance of the example optoelectronic transceiver module of FIG. 3A without the example gasket of FIG. 4A.
Figure 5B:
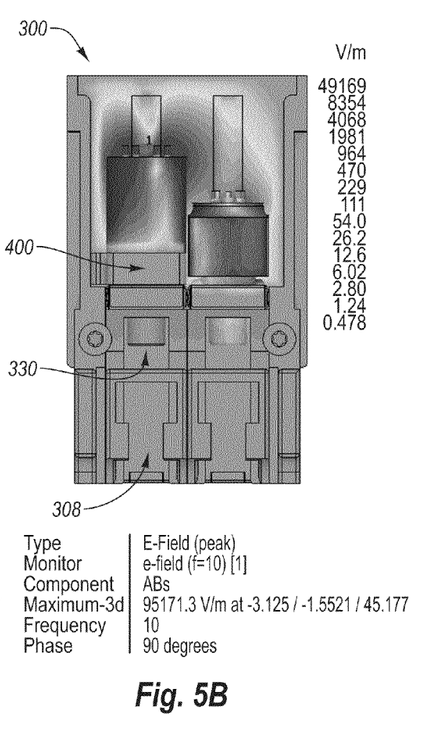
FIG. 5B discloses simulated electromagnetic radiation performance of the example optoelectronic transceiver module of FIG. 3A with the example conductive OSA grounding gasket of FIG. 4A.

With reference now to FIGS. 5A and 5B, simulated aspects of the functionality of the example conductive OSA grounding gasket 400 are disclosed. In particular, FIG. 5A discloses the optoelectronic transceiver module 300 without the example gasket 400 and FIG. 5B discloses the optoelectronic transciever module 300 with the example gasket 400. As disclosed in FIG. 5A, without the gasket 400 there is significant electromagnetic radition escaping through the port 330 of the TOSA 312 and through the output port 308. However, as disclosed in FIG. 5B, with the gasket 400 there is significantly less electromagnetic radition escaping through the port 330 of the TOSA 312 and through the output port 308. Therefore, these simulated results demonstrate that the volumetric electrical grounding of the example gasket 400 can significantly decrease the amount of electromagnetic radiation that escapes the module 300, thus decreasing the occurrence of electromagnetic interference (EMI) in surrounding devices (not shown).

Figure 6:
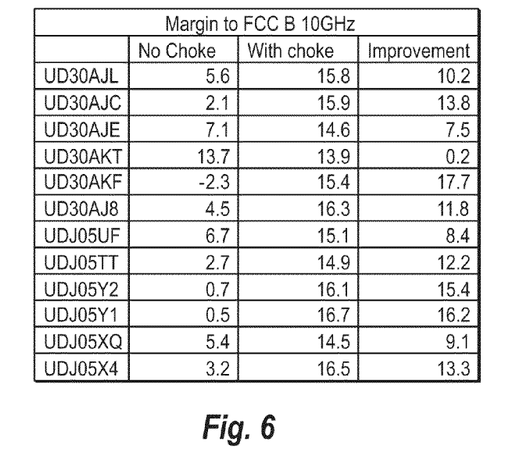
FIG. 6 is a chart of actual electromagnetic radiation performance of the example optoelectronic transceiver module of FIG. 3A with and without the example conductive OSA grounding gasket of FIG. 4A.

With reference now to FIG. 6, actual test results of the example electromagnetic transceiver module 300 are disclosed with and without the example gasket 400. As disclosed in FIG. 6, the performance in each actual test was superior with the use of the gasket 400 in the module than without the gasket 400.

The example embodiments disclosed herein are to be considered in all respects only as illustrative and not restrictive.

What is claimed is:

1. A conductive optical subassembly (OSA) grounding gasket assembly comprising:
   a top gasket comprising:
      a top shell surface configured to be in direct physical contact with a conductive top shell of an optoelectronic module; and
      a top OSA surface configured to make direct physical contact with a conductive housing of an OSA; and
   a bottom gasket comprising:
      a bottom OSA surface configured to be in direct physical contact with the conductive housing of the OSA; and
      a bottom shell surface configured to make direct physical contact with a conductive bottom shell of the optoelectronic module.

2. The gasket assembly as recited in claim 1, wherein the top and bottom gaskets are identical in size and shape.

3. The gasket assembly as recited in claim 1, wherein the top gasket further comprises second and third top shell surfaces configured to be in direct physical contact with the conductive top shell of the optoelectronic module.

4. The gasket assembly as recited in claim 1, wherein the top gasket and the bottom gasket are configured to substantially surround a perimeter of a conductive barrel of the OSA.

5. The gasket assembly as recited in claim 1, wherein the top gasket and the bottom gasket are formed from a conductive elastomer.

6. The gasket assembly as recited in claim 5, wherein the top gasket and the bottom gasket are formed from CHO-SEAL® 6370 or 6317.

7. An optoelectronic transceiver module comprising:
   a conductive shell comprising a conductive top shell and a conductive bottom shell configured to mate with the conductive top shell;
   a printed circuit board at least partially positioned within the conductive shell;
   a transceiver optical subassembly (TOSA) at least partially positioned within the conductive shell, the TOSA comprising a conductive housing and a transmitter positioned within the conductive housing;
   a receiver optical subassembly (ROSA) at least partially positioned within the conductive shell, the ROSA comprising a housing and a receiver positioned within the housing; and
   the gasket assembly as recited in claim 1 positioned within the conductive shell, wherein the top shell surface is in direct physical contact with the conductive top shell, the top OSA surface is in direct physical contact with the conductive housing of the TOSA, the bottom shell surface is in direct physical contact with the conductive bottom shell, the bottom OSA surface is in direct physical contact with the conductive housing of the TOSA, and the top gasket and the bottom gasket are configured to substantially surround a perimeter of the conductive housing of the TOSA.

8. A conductive OSA grounding gasket comprising:
   a top shell surface configured to be in direct physical contact with a conductive top shell of an optoelectronic module;
   an OSA surface configured to make direct physical contact with and substantially surround a conductive housing of an OSA; and
   a bottom shell surface configured to make direct physical contact with a conductive bottom shell of the optoelectronic module.

9. The gasket as recited in claim 8, further comprising a second bottom shell surface configured to be in direct physical contact with the conductive bottom shell of the optoelectronic module.

10. The gasket as recited in claim 8, wherein the OSA surface is configured to substantially surround a perimeter of a conductive barrel of the OSA.

11. The gasket as recited in claim 8, further comprising a recess configured to accommodate a rail portion of the conductive top shell.

12. The gasket as recited in claim 8, wherein the gasket is formed from a conductive elastomer.

13. The gasket as recited in claim 12, wherein the gasket is formed from CHO-SEAL® 6370 or 6317.

14. An optoelectronic transceiver module comprising:
   a conductive shell comprising a conductive top shell and a conductive bottom shell configured to mate with the conductive top shell;
   a printed circuit board at least partially positioned within the conductive shell;
   a transceiver optical subassembly (TOSA) at least partially positioned within the conductive shell, the TOSA comprising a conductive housing and a transmitter positioned within the conductive housing;
   a receiver optical subassembly (ROSA) at least partially positioned within the conductive shell, the ROSA comprising a housing and a receiver positioned within the housing; and
   the gasket assembly as recited in claim 1 positioned within the conductive shell, wherein the conductive top shell surface is in direct physical contact with the conductive top shell, the top OSA surface is in direct physical contact with the conductive housing of the TOSA, the conductive bottom shell surface is in direct physical contact with the conductive bottom shell, the bottom OSA surface is in direct physical contact with the conductive housing of the TOSA, and the top gasket and the bottom gasket are configured to substantially surround a perimeter of the conductive housing of the TOSA.

15. An optoelectronic transceiver module comprising:
   a conductive shell comprising a conductive top shell and a conductive bottom shell attached to the conductive top shell;
   a printed circuit board at least partially positioned within the conductive shell;
   a transceiver optical subassembly (TOSA) at least partially positioned within the conductive shell and electrically connected to the printed circuit board, the TOSA comprising a conductive barrel and a transmitter positioned within the conductive barrel;

a receiver optical subassembly (ROSA) at least partially positioned within the conductive shell and electrically connected to the printed circuit board, the ROSA comprising a barrel and a receiver positioned within the barrel; and one or more conductive TOSA grounding gaskets substantially surrounding a perimeter of the conductive barrel of the TOSA, the one or more conductive TOSA grounding gaskets including a first conductive TOSA grounding gasket comprising:

a top shell surface in direct physical contact with the conductive top shell; and a TOSA surface in direct physical contact with the conductive barrel of the TOSA.

16. The optoelectronic transceiver module as recited in claim 15, the one or more conductive TOSA grounding gaskets further comprising a bottom conductive TOSA grounding gasket comprising:

a bottom shell surface in direct physical contact with the conductive bottom shell; and a TOSA surface configured to make direct physical contact with the conductive barrel of the TOSA, wherein the first conductive TOSA grounding gasket and the bottom conductive OSA grounding gasket substantially surround the perimeter of the conductive barrel of the TOSA.

17. The optoelectronic transceiver module as recited in claim 16, wherein the optoelectronic transceiver module is substantially compliant with the X2 MSA.

18. The optoelectronic transceiver module as recited in claim 15, wherein the first conductive TOSA grounding gasket further comprises:

a bottom shell surface configured to make direct physical contact with a conductive bottom shell of the optoelectronic module housing.

19. The optoelectronic transceiver module as recited in claim 18, wherein the TOSA surface substantially surrounds the conductive barrel of the TOSA.

20. The optoelectronic transceiver module as recited in claim 19, wherein the optoelectronic transceiver module is substantially compliant with the XFP MSA.

* * * * *